Patented Mar. 4, 1924.

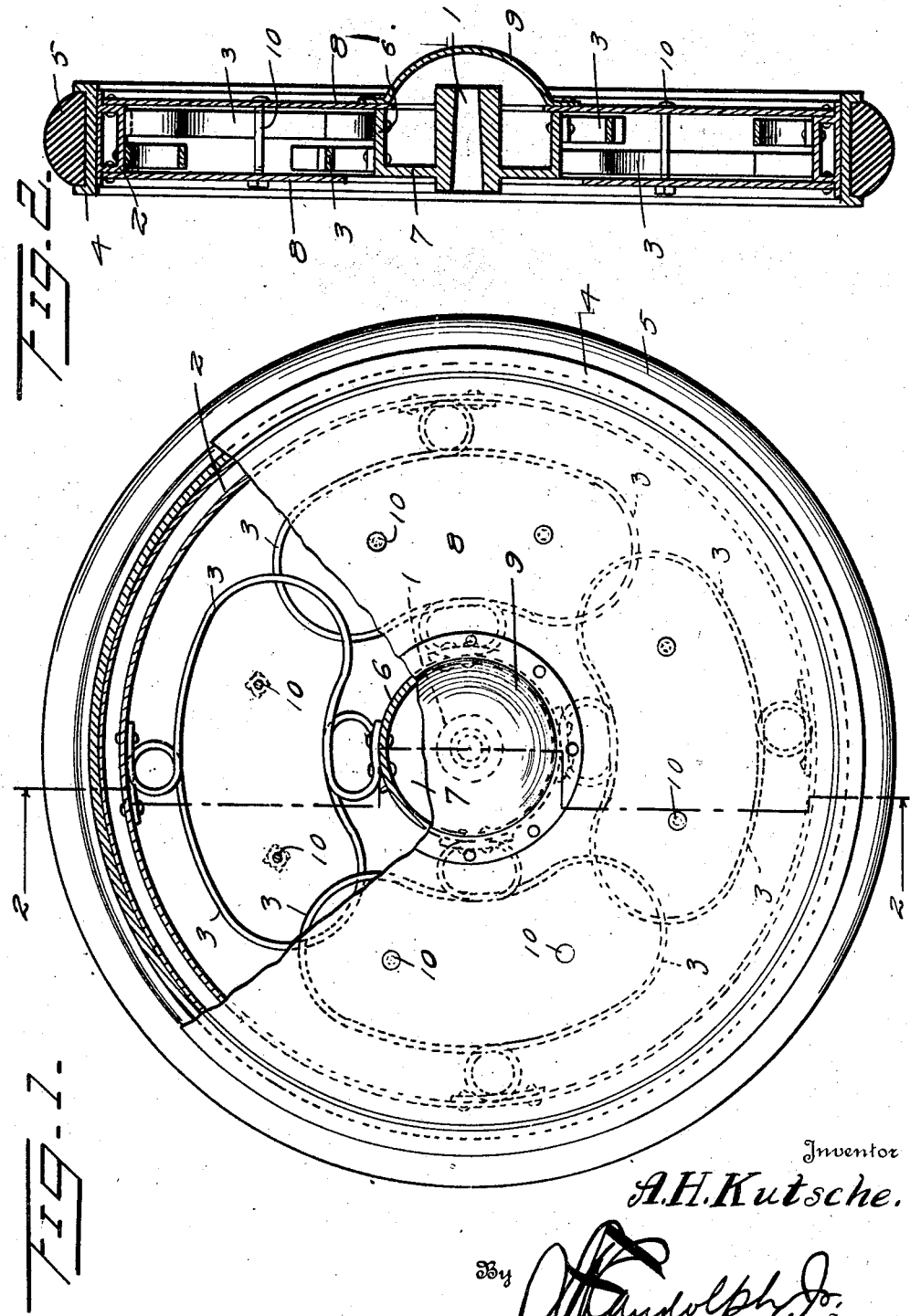

1,486,024

UNITED STATES PATENT OFFICE.

ARTHUR H. KUTSCHE, OF MONROE, MICHIGAN.

SPRING WHEEL.

Application filed May 2, 1923. Serial No. 636,187.

*To all whom it may concern:*

Be it known that I, ARTHUR H. KUTSCHE, a citizen of the United States, residing at Monroe, in the county of Monroe and State of Michigan, have invented certain new and useful Improvements in Spring Wheels; and I do hereby declare the following to be a full, clear, and exact description of the invention, such as will enable others skilled in the art to which it appertains to make and use the same.

The invention has relation to vehicle wheels and more particularly to wheels designed for motor vehicles, such as automobiles, and having a yieldable tread to compensate for shock and vibration.

The principal object of the invention is the provision of a spring wheel embodying a solid tire and spring spokes, the latter being enclosed between disks which protect and sustain the same against lateral strain.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view of a spring wheel embodying the invention, and

Figure 2 is a sectional view thereof on the line 2—2 of Figure 1.

Corresponding and like parts are referred to in the following description and designated in both views of the drawings by like reference characters.

The wheel comprises a hub 1, a felloe 2, spring spokes 3 and a band 4 mounted upon the felloe and receiving a solid tire 5 of rubber or other yieldable and elastic material. A band 6 is connected to the hub 1 by means of a web 7 and the inner ends of the spokes 3 are secured thereto by suitable fastening means such as bolts or rivets. The felloe 2 is of channel formation and formed with outer flanges upon which the band 4 is seated and secured by rivets or other fastening means.

The spring spokes 3 are approximately of U-form with opposite end portions reversely bent and secured to the hub and rim. In accordance with the invention, the spokes may be disposed in the same or different planes, as preferred, and according to the construction of the wheel. As indicated in the drawings, the wheel comprises two sets of spokes which are disposed in different planes, the spokes of one set being reversely disposed to the spokes of the other set, and the intermediate portions of the spokes overlap. By having the spokes reversely disposed, the spokes of one set brace the spokes of the other set and operate to prevent circumferential movement of the rim of the wheel. The spokes may be of any cross sectional outline and, as indicated, are of flat formation.

Annular plates or disks 8 are disposed upon opposite sides of the spokes and are attached at their outer edges to the felloe 2. These plates or disks enclose the spokes and prevent injury thereto and the collection of mud, and furthermore serve as bracing means to sustain lateral stresses. A cap 9 closes the open side of the band 6 and extends over the outer end of the hub 1. Tie-bolts 10 connect the plate or disk whereby to brace the same laterally.

What is claimed is:

1. A spring wheel having a hub, a web integral therewith and at one side thereof, a band integral with and extending inwardly from said web, a felly, plates secured against the sides of the felly, and spring spokes disposed between said plates and secured to said band and felly.

2. A spring wheel having a hub, a felly, resilient spokes, said spokes each having a loop, each loop having its terminals reversed and formed into auxiliary loops, said auxiliary loops being secured to said hub and felly, said spokes being arranged in pairs, and the different spokes of each pair being reversed and having their auxiliary loops in overlapping relation.

3. A spring wheel comprising a hub, a band concentric with the hub and spaced therefrom, a web connecting an end portion of the hub with an edge portion of the band, a channel felloe having outer flanges, spring spokes connecting the felloe with said band, a band mounted upon the felloe and attached to the flanges thereof and receiving the tire, a cap closing the open side of the band connected to the hub and extending across the outer end of the latter, and plates upon opposite sides of the spokes and attached at their outer edges to opposite sides of the felloe, said plates being connected and braced laterally by bolts.

In testimony whereof I affix my signature in presence of two witnesses.

ARTHUR H. KUTSCHE.

Witnesses:
CLARK D. HERKIMER,
JOHN C. LENNKE.